US009902442B2

(12) United States Patent
Moyna

(10) Patent No.: US 9,902,442 B2
(45) Date of Patent: Feb. 27, 2018

(54) TRACK LINK

(71) Applicant: John P. Moyna, Elkader, IA (US)

(72) Inventor: John P. Moyna, Elkader, IA (US)

(*) Notice: Subject to any disclaimer, the term of this patent is extended or adjusted under 35 U.S.C. 154(b) by 8 days.

(21) Appl. No.: 15/091,227

(22) Filed: Apr. 5, 2016

(65) Prior Publication Data

US 2016/0288846 A1 Oct. 6, 2016

Related U.S. Application Data

(60) Provisional application No. 62/143,550, filed on Apr. 6, 2015.

(51) Int. Cl.
*B62D 55/08* (2006.01)
*B62D 55/14* (2006.01)
*B62D 55/20* (2006.01)

(52) U.S. Cl.
CPC ........... *B62D 55/14* (2013.01); *B62D 55/202* (2013.01)

(58) Field of Classification Search
CPC ....... B62D 55/08; B62D 55/14; B62D 55/202
USPC ....... 305/103, 115, 137, 142, 171, 193, 196, 305/198, 201, 202, 203
See application file for complete search history.

(56) References Cited

U.S. PATENT DOCUMENTS 3,955,855 A * 5/1976 Massieon ............... B62D 55/26 305/192
4,425,007 A * 1/1984 Soeteber ............... B62D 55/12 305/111
4,861,120 A * 8/1989 Edwards ............. B62D 55/088 305/158
5,120,405 A 6/1992 Te et al.
5,409,306 A * 4/1995 Bentz ..................... B62D 55/20 305/185
5,704,697 A * 1/1998 Ketting .................. B62D 55/12 305/193
6,030,058 A * 2/2000 Snyder ................. B62D 55/244 305/115
6,120,405 A * 9/2000 Oertley .................. B62D 55/12 305/196
6,631,961 B1 * 10/2003 Bedford ............... B62D 55/145 305/100
6,659,573 B1 * 12/2003 Knecht .................. B62D 55/12 305/195
7,156,185 B2 1/2007 Juncker
7,201,242 B2 4/2007 Tucker
7,222,924 B2 5/2007 Christianson
(Continued)

FOREIGN PATENT DOCUMENTS

DE 2542310 A1 * 3/1977 ........... B62D 55/275
WO 20110127554 A1 10/2011

OTHER PUBLICATIONS

International Preliminary Examining Authority, "Notification of Transmittal of International Preliminary Report on Patentability", for PCT/US2016/026182, dated Jun. 9, 2017, 10 pages.

(Continued)

*Primary Examiner* — S. Joseph Morano
*Assistant Examiner* — Jean W Charleston
(74) *Attorney, Agent, or Firm* — Zarley Law Firm, P.L.C.

(57) ABSTRACT

A track assembly having a track link with a concave roller surface. The track link is connected to a track that is mounted about a plurality of rollers so that the concave roller surface engages the plurality of rollers.

19 Claims, 5 Drawing Sheets

(56) References Cited

U.S. PATENT DOCUMENTS 8,360,535 B2 1/2013 Johannsen
8,540,325 B2 9/2013 Diekevers et al.
9,216,782 B2 * 12/2015 Kunigk .................. B62D 55/12
9,371,630 B1 * 6/2016 Johannsen ................ E02F 9/26

OTHER PUBLICATIONS

DE2542310A1—EnglishTranslation.

* cited by examiner

TRACK LINK

CROSS-REFERENCE TO RELATED APPLICATIONS

This Application claims priority to Provisional Application U. S. Ser. No. 62/143,550 filed on Apr. 6, 2015, of which is herein incorporated by reference in its entirety.

BACKGROUND OF THE INVENTION

This invention is directed to track mobile machines, and more particularly a track link for a track chain assembly for a self-propelled mobile track machine.

Many mobile machines have tracked-chain assembly undercarriages that move towards the ground and come into contact with the ground as the machine moves forward. For example, many earthmoving machines like tractors and excavators may have such undercarriages as they are more useful given the debris and obstacles that would inhibit the use of inflated wheels. Tracked machines utilize endless track chains to propel the machines over terrain during operation. In doing so, the track chains conventionally transfer the machine's weight to a track link rail face via a bogie wheel that is attached to the machine's undercarriage, which in turn transfer's the machines weight through the track link rail to a track pad or shoe and then ultimately to the ground. The method of track movement is conventionally accomplished using a track links that has a flat planar surface rail face, such as that disclosed in U.S. Pat. No. 8,540,325.

The use of track links that have a flat planar rail face suffer from a number of deficiencies. In particular, the use of a flat planar rails suffer from increased wear, noise, and vibration during operation of the machine. The increased wear causes frequent repair and replacement of links, which slows production and decreases overall efficiency and increases costs. Additionally, increased vibration is detrimental to other components of the machine that are vibrated, which can also lead to further downtime. Further, the increased noise poises potential harm to workers as it increases workplace noise and distraction. Therefore, a need in the art exists to address these deficiencies and more.

An object of the invention is to provide a track link that reduces vibration, noise, and wear.

A further object of the invention is to provide a track link that reduces downtime and costs.

Yet a further object of the invention is to provide a track link that increases workplace safety.

A still further object of the present invention is to provide a track link that is easy to use.

SUMMARY OF THE INVENTION

Figure 1:
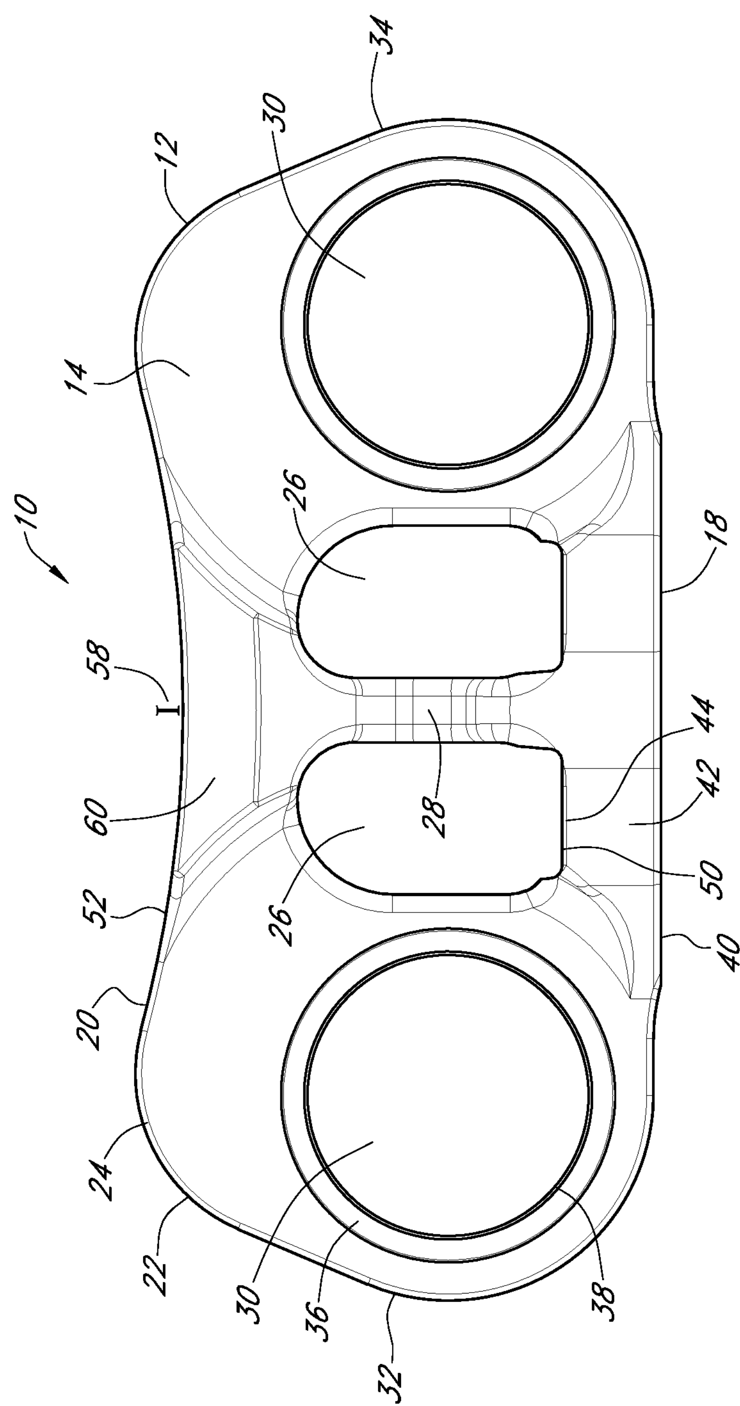
FIG. 1 is a front side view of a track link.
Figure 2:
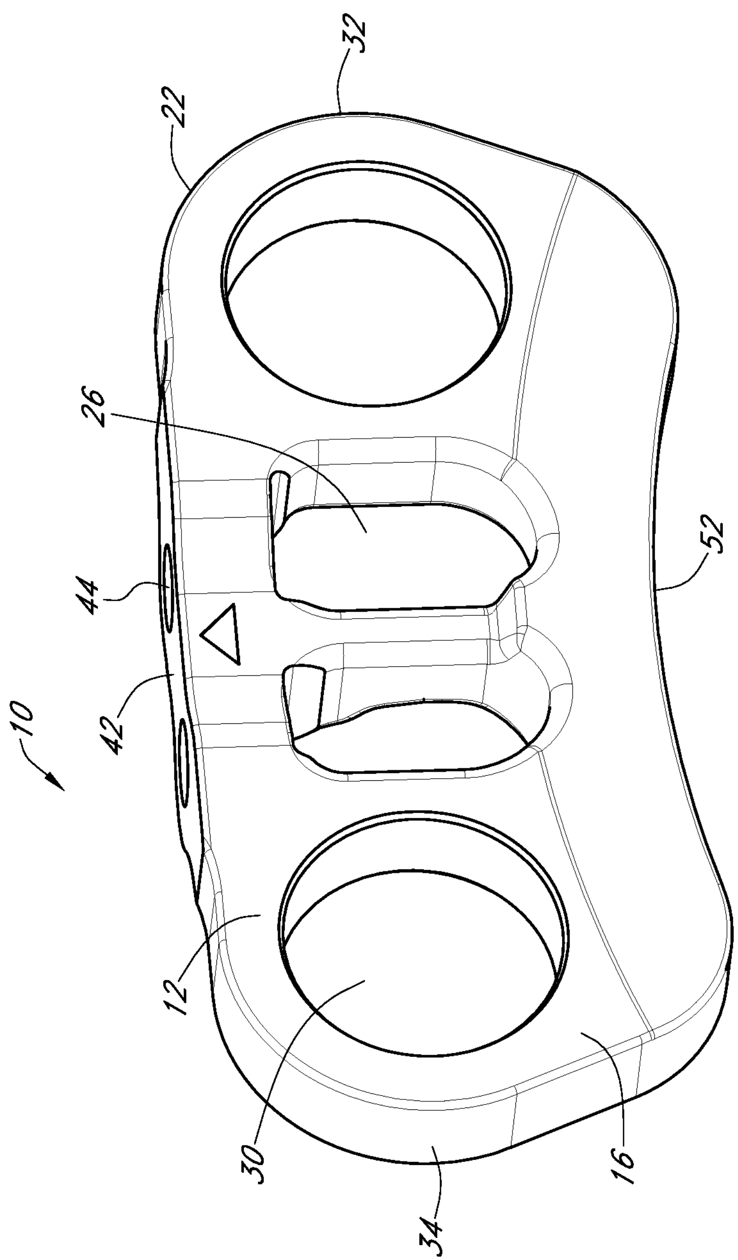
FIG. 2 is a perspective view of the back, bottom, and right side of a track link.
Figure 3:
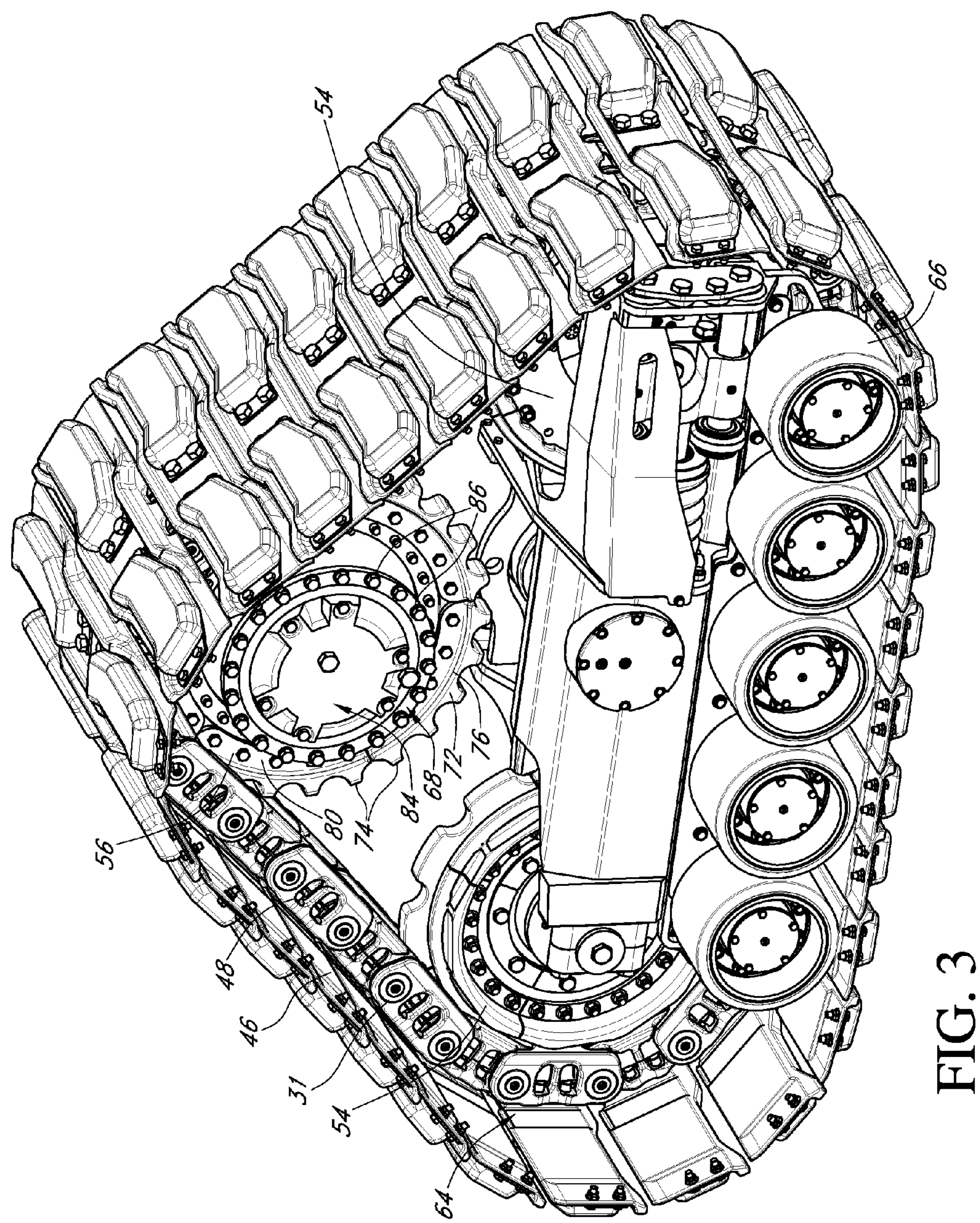
FIG. 3 is a perspective of a track chain assembly.
Figure 4:
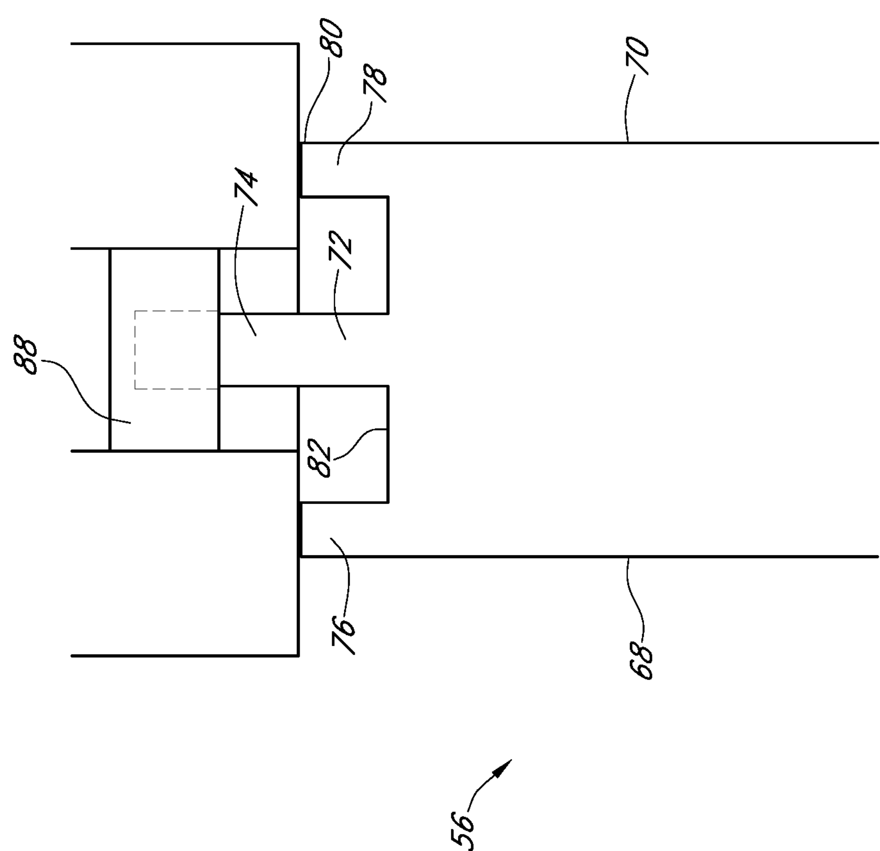
FIG. 4 is an end view of a drive roller.
Figure 5:
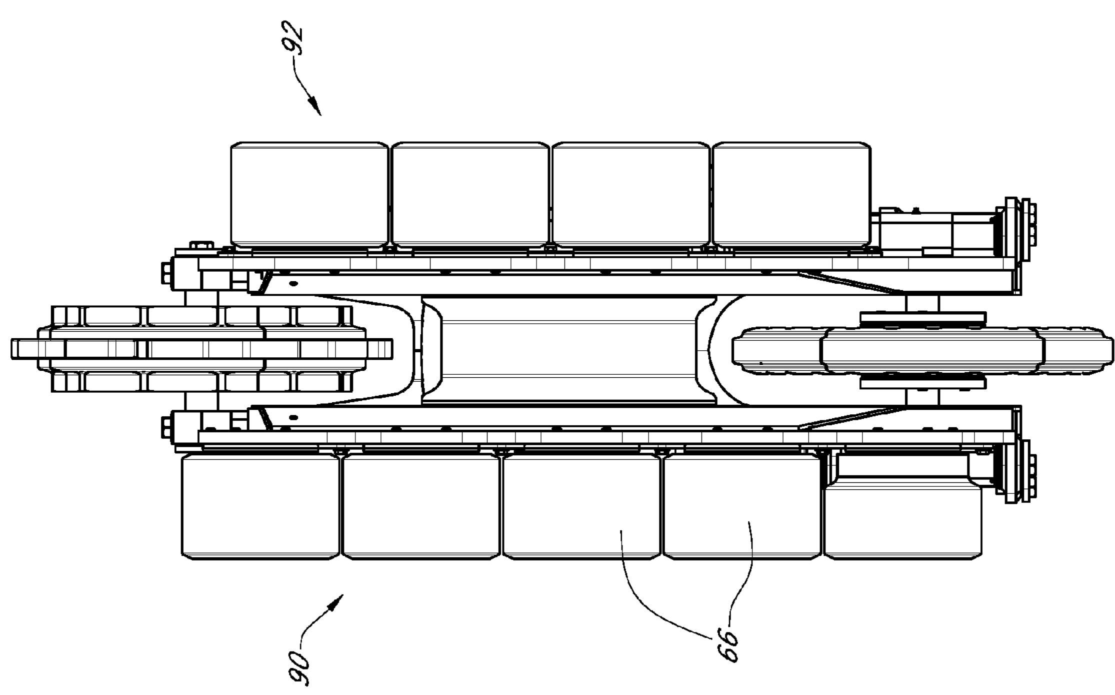
FIG. 5 is a top is a top plan view of a track assembly.

A track link for a track chain assembly is provided. The track link has a link body that has a front surface that in one embodiment is substantially planar and a rear surface that in one embodiment is also substantially planar. The front surface and rear surface are parallel or substantially parallel to one another. In one arrangement, the front surface and rear surface have one or more cavities that create openings in the link body. A pillar is positioned between the openings in the link body. A bottom surface of the track link has a shoe face that extends between and along the front surface and back surface. In one arrangement the shoe face has a bolt face that extends substantially outward from the front surface. The bolt face has one or more fastener holes extending parallel to the front surface and rear surface and through a portion of the link body and into the openings created by the cavities in the link body. A top surface of the link body has a concave roller face that extends between and along the front surface and back surface. In one arrangement the concave roller face has inner wear face extrusion extending substantially outward from the front surface.

DETAILED DESCRIPTION OF THE INVENTION

Referring to the Figures, a track link 10 includes a link body 12 having a front surface 14, a rear surface 16, a bottom surface 18, and a top surface 20. The link body 12 is of solid body design that is stable and resists wear. The link body 12 can be made of metal, such as steel, or any other suitable material that also allows for all track link 10 components to be made of a single body forging or mold. The front surface 14 and the rear surface 16 are either parallel or substantially parallel to one another. The exterior perimeter 22 of the link body 12 can have a side bevel 24 that reduces sharp point contact between track links 10.

In one arrangement, one or more clearance pockets 26 that extend through the front surface 14 and rear surface 16 to create openings in the link body 12. In one illustrative arrangement, two clearance pockets 26 are positioned near the center of the link body 12 and are separated by a pillar 28 that extends vertically between the bottom surface 18 and top surface 20. Clearance pockets 26 are sized and shaped to allow tools to pass through or tracking of mounting hardware components.

Near the ends of the link body 12 are one or more bore holes 30 that extend through the front surface 14 and rear surface 16 to create openings in the link body 12. In one embodiment, two bore holes 30 are positioned between a first side 32 and a second side 34 of the link body 12 and are sized and shaped identically. The bore holes 30, if present along with clearance pockets 26, are positioned outside the clearance pockets 26 and are sized and shaped to have a portion of link body 12 present therebetween. In one embodiment, the diameter of the bore holes 30 are sufficient to allow a cylindrical shaped cartridge 31 to pass through the opening of each bore holes 30. The diameter of the bore hole 30 should be sufficient to allow the cartridge 31 to pass through with a tight fit to prevent the easy removal of the cartridge 31 or coming out during operation. The cartridges 31 are sized and shaped to extend sufficiently past the track link 10 as to allow another track link 10 to be pressed on the same cartridge 21 in the alternative and opposing direction. The horizontal and vertical positioning of the track links 10 is maintained by the bore holes 30 that receive the cartridges 31 between the opposing track links 10.

In another embodiment, the one or more bore holes 30 have a seal clearance 36 that allows a cartridge seal to be seated in the seal clearance 36. The seal clearance 36 can be a bevel or an inset step within the bore holes 30. In addition, a cartridge press face 38 can run along the interior circumference of the seal clearance 36, or alternatively the bore hole 30, to seat a cartridge 31 along the entire diameter of the bore hole 30.

In one embodiment, the first side 32 and second side 34 are rounded to match the shape of the bore holes 30 near the bottom surface 18 and taper slightly towards the top surface 20. In other embodiments the first side and second side 34 are rounded to match the shape of the bore holes for the entire length between the bottom surface 18 and top surface 20. In other embodiments, the first side 32 and second side 34 are of any size and shape.

The bottom surface 18 of the track link 12 has a shoe face 40 that is flat or is generally flat and extends between the first side 32 and second side 34, and the front surface 14 and rear surface 16 of the track link 12. The shoe face 40 should be sufficiently long to provide for stability. Positioned near the midpoint of the bottom surface 18 and extending substantially outward from the front surface 14 is a bolt face 42. In one embodiment, the bolt face 42 extends between the length of the one or more clearance pockets 26 and pillar 28. The bolt face 42 also extends upwardly to near a midpoint of the link body 12, but may also extend more of less of the length of the link body 12.

Disposed within the bolt face 42 is one more fastener holes 44. The fastener holes 44 extend vertically through the bolt face 42 and a portion of link body 12, and parallel to the front surface 14 and rear surface 16. The fastener holes 44 extend vertically to the openings formed by the clearance pockets 26, thereby allowing tools to pass into the clearance pockets 26 to fasten the track link 12 to a track 46 using fasteners 48, such as a bolt and nut. In one arrangement, the fastener holes 44 are sized and shaped to leave a mounting face 50 on the top of the bolt face 42 to engage with the fasteners 48. In one illustrative arrangement, two identical fastener holes 44 are offset from the vertical centerline of the track body 12, but remain centered on the width of the bolt face.

The top surface 20 has a downwardly concave roller face 52 that extends between the first side 32 and second side 34, and the front surface 14 and rear surface 16 of the track link 12. The concave roller face 52 is sized and shaped to contact idler wheels 54, thereby reducing noise, force, and wear. Alternatively, the concave roller face 52 can be sized and shaped to contact the other undercarriage components, such as a drive sprocket. Contact with undercarriage components may run the entire length of the concave roller face 52 or only a portion therefore. Additionally, in one embodiment the concave roller face 52 is sized and shaped to match the radius 58 of the idler wheels 54 and a drive sprocket, or one or the other. In this manner the combined link bodies form a continuous radius about wheels 54.

Positioned near the midpoint of the top surface 20 and extending substantially outward from the front surface 14 is an inner wear face extrusion 60. In one arrangement, the inner wear face extrusion 60 extends between the midpoints of the clearance pockets 26 and pillar. In other arrangements, the inner wear face extrusion extends ⅓ of the length of the concave roller face 52. The inner wear face extrusion also extends downwardly to near a midpoint of the link body 12, but may also extend more or less of the length of the link body. In one illustrative embodiment, the inner wear face extrusion 60 tapers back slightly toward the top surface 20. In one arrangement, the inner wear face extrusion 60 and the bolt face 42 connect near a midpoint of the link body 12 and pillar 28. The bolt face 42 and inner wear face extrusion 60 can extend outwardly any suitable distance, but in one arrangement both extend outwardly the same distance. In another arrangement, the bolt face 42 and inner wear face extrusion 60 extend outwards twice the depth of the link body 14 and run a length of one-third of the link body's 12 width.

The side bevel 24 can vary in size and shape along the shoe face 40 and inner wear face extrusion 60. In one arrangement the side bevel 24 is the same size and shape around the entire perimeter 22. In other arrangements, the side bevel 24 near the shoe face 40 and inner wear face extrusion 60 is sized and shaped to increase contact with the idler wheels 54, thereby reducing vibration, noise, and wear, and increasing the life of the track link 10 and other components.

In one embodiment of the invention, the front surface 14 is substantially concave and convex portions, with the front surface 16 having an outward convex progression near the bolt face 42 and fastener holes 44 and inward concave progression between the fastener holes 44. Alternatively, or additionally, the rear surface 16 is at least partially concave.

In operation, a plurality of track links 10 are positioned in two continuous rows, where one row has the rear surface 16 of the track links facing the interior of a machine 62 and the other row has its rear surfaces 16 facing the exterior of the machine 62. The front surfaces 14 of the two rows of track links 10 are positioned inwards facing one another. The track links 10 are spaced apart within their respective row such that space there is enough space to fit the bolt face 42 and inner wear face extrusion 60 from the opposite row of track links, thereby forming an interlocking track link assembly 64 of the two rows of track links 10. Cartridges 31 are positioned within bore holes 30 to connect one track link 10 in one row to a track link 10 in the second row such that the first track link 10 is connected to two other track links 10.

When the track link assembly 64 is assembled, the track link assembly 64 is positioned and fastened to the track 46 using fasteners 48 positioned within the fastener holes 44, such that the shoe face 40 engages the interior of the track 46. When the track assembly 64 is positioned around idler wheels 54, the concave roller face 52 contacts the radius or outer surface of the idler wheels 54 resulting in less vibration, noise, and wear. A plurality of bogie wheels or mid rollers 66 positioned adjacent the track assembly 64 engage the interior of the track 64 and transfer the weight of the machine 62 to the track 46. The bogie wheels 66 do not make contacted with the track links 10.

In a preferred embodiment, the drive wheel 56 is made of polyurethane or the like. The drive wheel 56 has a first side 68 and a second side 70 with a sprocket 72 having a plurality of outwardly projecting teeth 74 that extends around the wheel 56 between the sides 68 and 70. Each side 68 and 70 has a rim 76 and 78 that extends around an outer periphery 80 of the drive wheel 56 and forms a web 82 therebetween.

The interior 84 of drive wheel 56 is formed to receive the planetary (not shown) of the axle or drive shaft (not shown). Positioned radially from the center of drive wheel 56 are a plurality of holes that receive bolts 86 to attach drive wheel 56 to the planetary.

When assembled, the concave roller face 52 of adjacent links 10 forms a continuous radius that engages rims 76 and 78, while the teeth 74 of sprocket 72 fit between cartridges 88 to drive track 46. Use of the polyurethane drive wheel 56 against steel links 10 reduce wear.

Also, in a preferred embodiment, an outer row 90 of mid rollers 66 are offset from an inner row 92 of mid rollers 66. By offsetting the mid-rollers 66, shoe pitch is reduced, the load is spread out, and the improvement leads to an assembly that is more quiet, more smooth, and lasts longer.

Therefore, a track link 10 has been provided that reduces vibration, noise, and wear, reduces downtime and costs, increases workplace safety and productivity, is easy to use, and improves upon the state of the art.

From the above discussion and accompanying figures it will be appreciated that the track link 10 offers many advantages over the prior art. It will also be appreciated by those skilled in the art that other modifications could be made without parting from the spirit and scope of the invention and fall within the scope of the claims and are intended to be covered thereby.

What is claimed is:

1. A track link assembly, comprising:

a drive wheel having a first side with a first rim and a second side with a second rim, wherein the first rim and second rim extend around an outer periphery of the drive wheel;

a track connected to a plurality of links wherein the links have a concave roller face on a top surface of the link;

the track is mounted about a plurality of idlers so that the concave roller face of the links contacts an outer surface of the plurality of idlers, wherein when assembled, the concave face of the plurality of links form a continuous radius configured to engage at least one of the rims of the drive wheel; and a plurality of mid-rollers are positioned to engage an interior of the track without contacting the links.

2. The assembly of claim 1 further comprising an outer row of mid-rollers that are offset from an inner row of mid-rollers.

3. The assembly of claim 1 wherein the plurality of idlers includes a drive idler made of a non-metallic material.

4. The assembly of claim 3 wherein the drive idler has an interior formed to receive a planetary.

5. The assembly of claim 1 further comprising a plurality of cartridges, wherein each cartridge is positioned within a bore hole in a pair of overlapping and opposing links of the plurality of links.

6. The assembly of claim 5 further comprising the drive wheel having a sprocket with a plurality of teeth configured to fit between the plurality of cartridges to drive the track.

7. The assembly of claim 1 further comprising a first web positioned between the first rim and a sprocket of the drive wheel.

8. The assembly of claim 7 further comprising a second web positioned between the second rim and the sprocket of the drive wheel.

9. A track assembly, comprising:

a track connected to a plurality of links and mounted about a plurality of idlers;

an outer row of mid-rollers positioned on one side of the drive wheel, wherein the outer row of mid-rollers engage the track without engaging a plurality of links positioned on one side of the links; and an inner row of mid-rollers positioned on the opposite side of the drive wheel, wherein the inner row of mid-rollers engage the track without engaging the plurality of links positioned on the opposite side of the links.

10. The assembly of claim 9 wherein the plurality of idlers include a drive idler made of a non-metallic material.

11. The assembly of claim 9 wherein the outer row of mid-rollers positioned are offset to the inner row of mid-rollers.

12. A track link assembly, comprising:

a drive wheel having a first side with a first rim and a second side with a second rim, wherein the first rim and second rim extend around an outer periphery of the drive wheel;

a track connected to a plurality of links;

the track is mounted about a plurality of idlers so that the links form a continuous radius configured to engage at least one of the rims of the drive wheel; and a plurality of mid-rollers are positioned to engage an interior of the track without contacting the links.

13. The assembly of claim 12 further comprising a first web positioned between the first rim and a sprocket of the drive wheel.

14. The assembly of claim 12 further comprising a second web positioned between the second rim and the sprocket of the drive wheel.

15. The assembly of claim 12 further comprising an outer row of mid-rollers that are offset from an inner row of mid-rollers.

16. The assembly of claim 12 wherein the plurality of idlers includes a drive idler made of a non-metallic material.

17. The assembly of claim 16 wherein the drive idler has an interior formed to receive a planetary.

18. The assembly of claim 12 further comprising a plurality of cartridges, wherein each cartridge is positioned within a bore hole in a pair of overlapping and opposing links of the plurality of links.

19. The assembly of claim 18 further comprising the drive wheel having a sprocket with a plurality of teeth configured to fit between the plurality of cartridges to drive the track.

* * * * *